United States Patent
Weng et al.

(10) Patent No.: US 7,702,993 B2
(45) Date of Patent: *Apr. 20, 2010

(54) DATA RECORDING METHOD FOR OPTICAL DISK DRIVE

(75) Inventors: Yih-Shin Weng, Jhubei (TW); Hong-Ching Chen, Fongshan (TW)

(73) Assignee: Mediatek Inc., Hsinchu (TW)

( * ) Notice: Subject to any disclaimer, the term of this patent is extended or adjusted under 35 U.S.C. 154(b) by 417 days.

This patent is subject to a terminal disclaimer.

(21) Appl. No.: 11/747,446

(22) Filed: May 11, 2007

(65) Prior Publication Data

US 2007/0206473 A1 Sep. 6, 2007

Related U.S. Application Data

(63) Continuation of application No. 10/711,381, filed on Sep. 15, 2004, now Pat. No. 7,234,102.

(30) Foreign Application Priority Data

Sep. 30, 2003 (TW) .............................. 92127088 A (51) Int. Cl.
G06F 11/00 (2006.01)
G08C 25/00 (2006.01)
H03M 13/00 (2006.01)
H04L 1/00 (2006.01)

(52) U.S. Cl. ................. 714/799; 369/47.11; 369/47.33; 369/47.3; 369/53.31; 369/53.37; 369/59.25

(58) Field of Classification Search .................. 714/799; 369/47.11, 47.33, 47.3, 53.31, 59.25, 53.37
See application file for complete search history.

(56) References Cited

U.S. PATENT DOCUMENTS 5,815,472 A 9/1998 Kuroda et al.
5,970,031 A 10/1999 Huang et al.
6,418,099 B2 7/2002 Yamamoto (Continued)

FOREIGN PATENT DOCUMENTS

CN 1387184 A 12/2002

(Continued)

OTHER PUBLICATIONS

Data Interchange on Read-Only 120 mm Optical Data Disks (CD-ROM), Standard ECMA-130, 2nd Ed., Jun. 1996.

*Primary Examiner*—Sam Rizk
(74) *Attorney, Agent, or Firm*—Connolly Bove Lodge & Hutz LLP (57) ABSTRACT

A data recording method for an optical disk drive is implemented by the following steps. First, one or more data blocks are encoded and recorded sequentially, and it detects if a buffer under run occurs. If a buffer under run occurs, the recording does not stop immediately until at least the main data of the data block being currently recorded have been recorded completely. Afterwards, it restarts to encode and record from the data block next to the data block where the recording stops. Moreover, the recording also can stops if a servo error is detected, and the data restart to encode and record from the data block where the recording stops or at least one data block preceding the data block where the recording stops.

7 Claims, 6 Drawing Sheets

U.S. PATENT DOCUMENTS

| | | |
|---|---|---|
| 6,560,180 B1 | 5/2003 | Tsukihashi et al. |
| 6,795,382 B2 | 9/2004 | Kitamura et al. |
| 6,876,608 B2 | 4/2005 | Yamamoto et al. |
| 6,930,964 B2 | 8/2005 | Matsui |
| 6,992,957 B2 | 1/2006 | Hayashi et al. |
| 7,023,784 B2 | 4/2006 | Chang et al. |
| 7,234,102 B2 * | 6/2007 | Weng et al. .................. 714/799 |
| 2002/0172106 A1 | 11/2002 | Kim |
| 2003/0165093 A1 | 9/2003 | Tanaka |
| 2003/0185129 A1 | 10/2003 | Chang et al. |
| 2004/0062165 A1 | 4/2004 | Tanimukai |

FOREIGN PATENT DOCUMENTS

| | | |
|---|---|---|
| JP | 2000298924 | 10/2000 |

* cited by examiner

FIG. 6

DATA RECORDING METHOD FOR OPTICAL DISK DRIVE

CROSS-REFERENCE TO A RELATED APPLICATION

This application is a Continuation Application of U.S. patent application Ser. No. 10/711,381 filed on Sep. 15, 2004. Application Ser. No. 10/711,381 claims priority under 35 USC 119 to Taiwanese Application Ser. No. TW092127088 filed on Sep. 30, 2003. Co-pending related application Ser. No. 11/458,304 is a division of Ser. No. 10/711,381. The entire contents of each application are incorporated herein by reference.

BACKGROUND OF THE INVENTION (A) Field of the Invention

The present invention is related to a data recording method for an optical disk drive, more specially, to a data recording method for an optical disk drive for dealing with the event of recording interruption.

(B) Description of the Related Art

If abnormal servo signals of an optical disk drive caused by, for example, vibration, track-locking errors on a disk or laser defocusing, are detected, or a so-called buffer under run occurs because the host transfer speed cannot catch up with the recording speed, the recording is interrupted. The recording is not continued until the vibration stops, the track is locked again, the laser refocuses or sufficient data is supplemented in the buffer.

Figure 1:
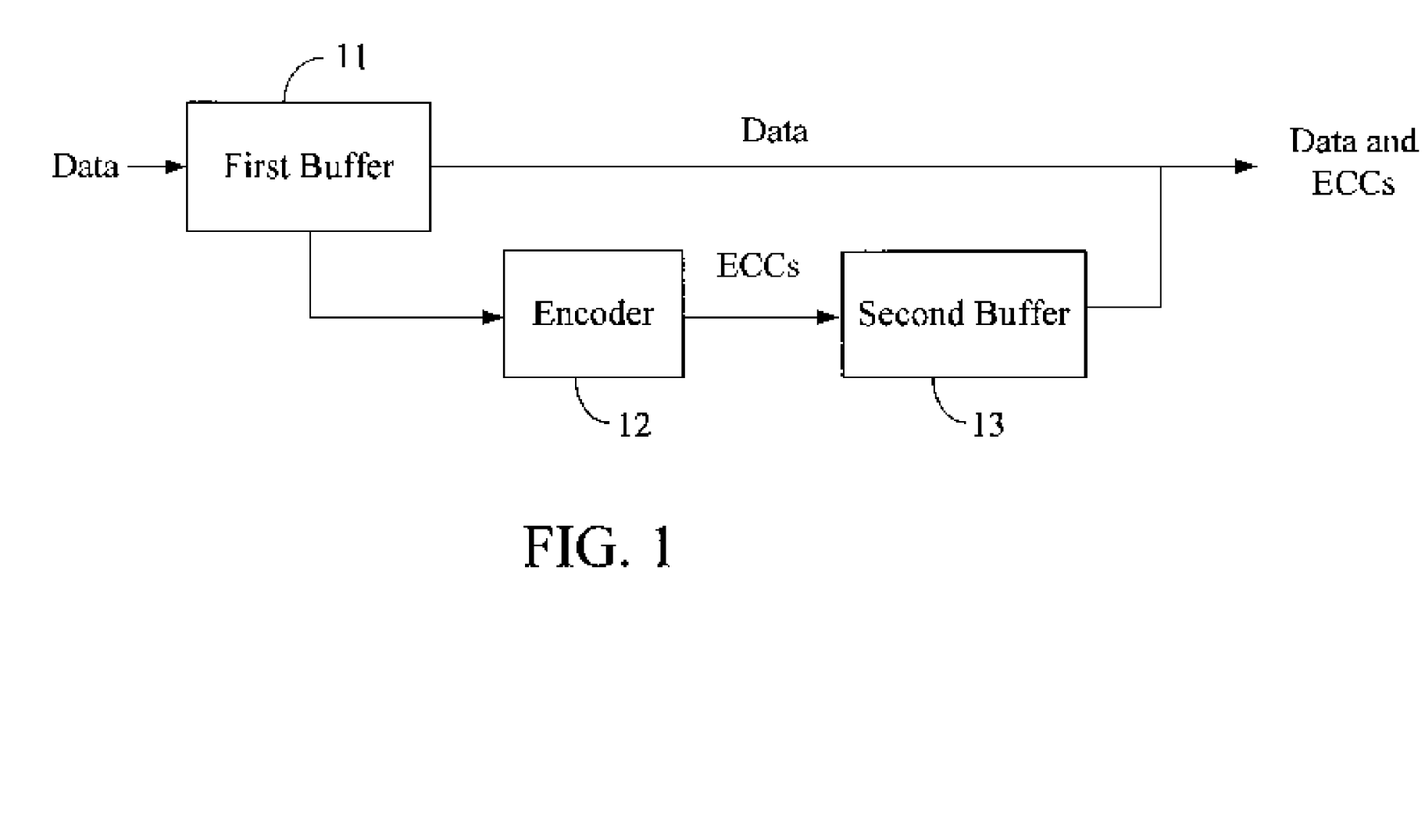
FIG. 1 illustrates a known recording data generation method for an optical disk drive.

In general, the data to-be-recorded are divided into data blocks in advance, and are sequentially recorded in unit of data blocks. As shown in FIG. 1, the host data to be recorded are transferred to a first buffer 11 by the host (not shown), and are encoded by an encoder 12 to generate error correction codes (ECCs), in which it needs to wait the entire data of a data block have been received completely for generating the related ECCs. In practice, the encoder 12 first encodes several data blocks, and the encoded ECCs are temporarily stored in a second buffer 13 for further uses. Afterwards, the data and ECCs are both recorded in the optical disk.

Figure 2:
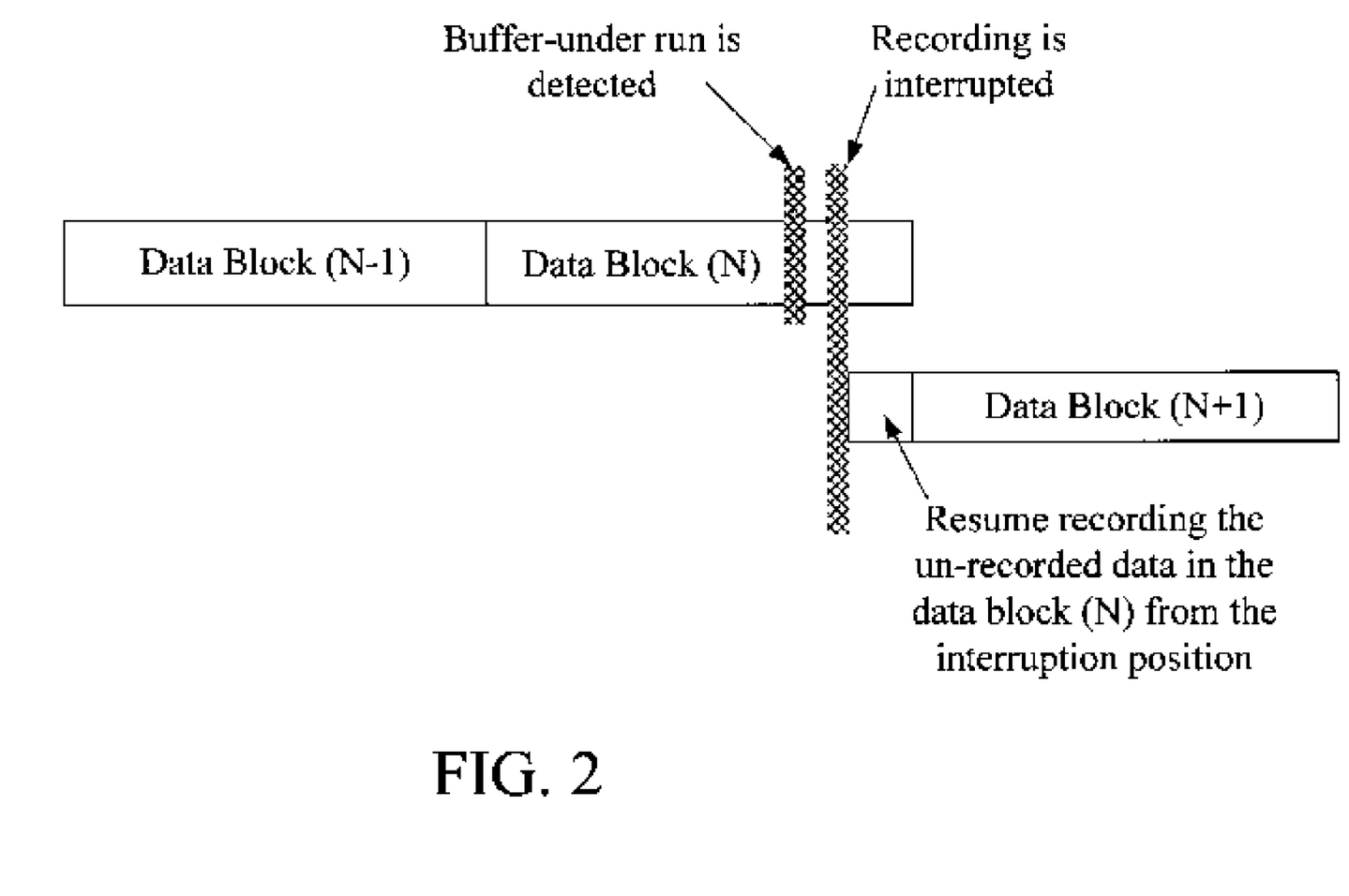
FIG. 2 illustrates a known data recording method for an optical disk drive.

Referring to FIG. 2, U.S. Pat. No. 6,418,099 B2 discloses an optical disk apparatus, in which recording is interrupted immediately once a buffer under run is detected, and the interruption position is stored as the starting position of the next recording. When the recording is continued, it starts to record the data and ECCs from the interruption position. In other words, it firstly records the rest unrecorded data of the data block where the buffer under run occurs, and continues to record the following next data blocks. Because the encoded ECCs are still stored in the second buffer 13 of FIG. 1, thereby it doesn't to re-encode when the recording is continued. However, the above recording method has to record the recording interruption position and maintains data in the second buffer 13 during interruption. Furthermore, the inaccuracy of the start recording position may result in data loss.

SUMMARY OF THE INVENTION

The objective of the present invention is to provide a data recording method for an optical disk drive for dealing with the event of recording interruption, by which recording manners can be unitized and the inferior recording quality caused by servo signal errors can be avoided.

In the first embodiment, the data recording method for an optical disk drive put forth in the present invention includes the following steps. First, several data blocks are encoded and recorded sequentially, and it detects if the buffer under run occurs. If the buffer under run occurs, the recording does not stop immediately until at least the main data of the data block where the buffer under run occurs have been recorded completely. Afterwards, the data block next to the data block where the buffer under run occurs is re-encoded and recorded.

In the second embodiment, the data recording method for an optical disk drive of the present invention includes the following steps. First, one or more data blocks are encoded and recorded sequentially, and it detects if the servo signal error occurs. If the servo signal error occurs, the recording stops immediately. Afterwards, it restarts to encode and record the data block where the recording stops or a data block preceding the data block where the recording stops.

DETAILED DESCRIPTION OF THE INVENTION

Figure 3:
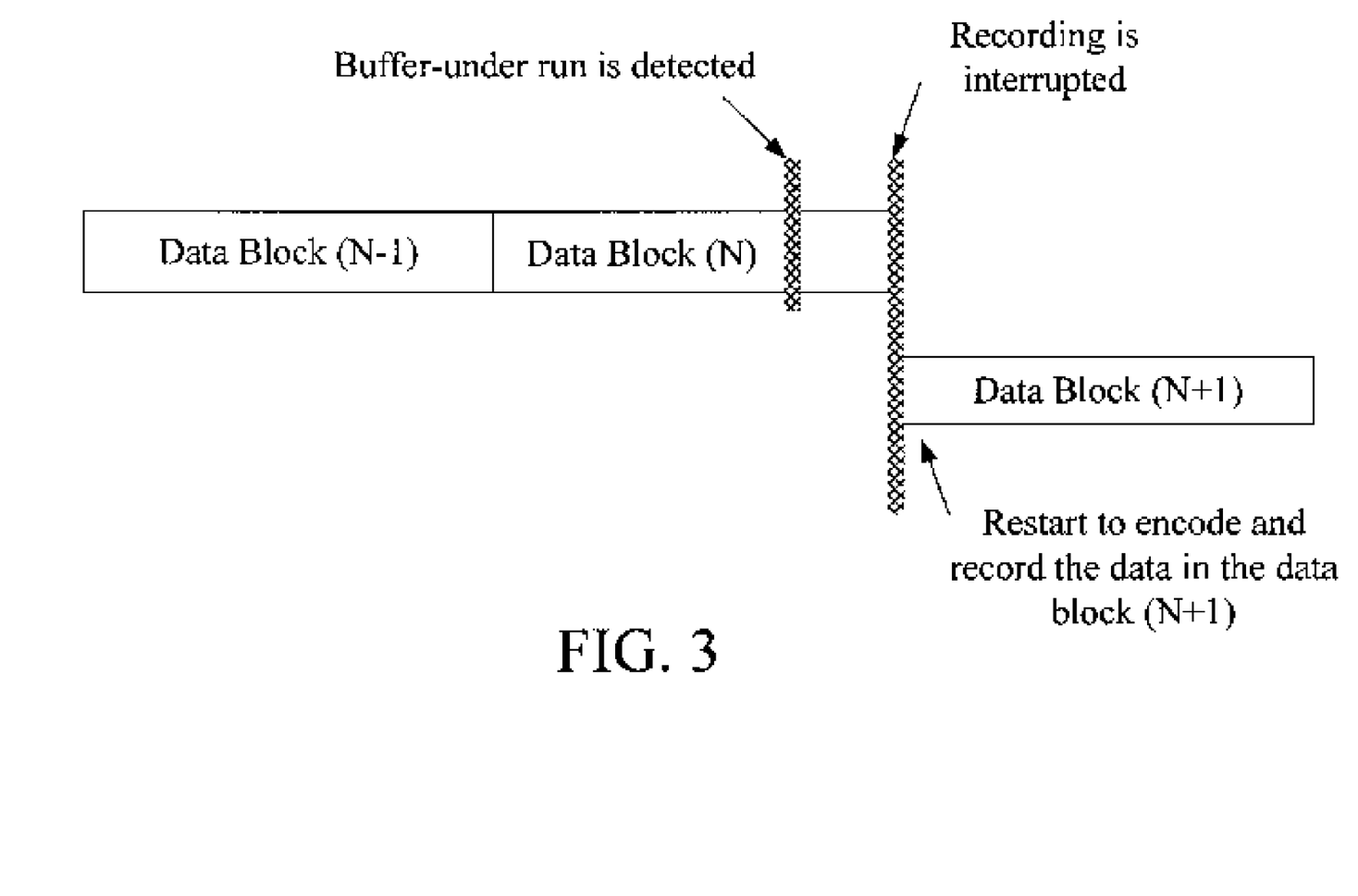
FIG. 3 illustrates the data recording method for an optical disk drive of the first embodiment in accordance with the present invention.

FIG. 3 is the illustrative diagram of the data recording method for an optical disk drive of the first embodiment in accordance with the present invention, which shows the situation when a buffer under run occurs. The buffer under run is a situation that the number of data blocks including data and ECCs in the buffer, which is available to be recorded, is smaller than a threshold value. Generally, a data block includes a main data area for storing the host data and an auxiliary data area for storing the ECCs. When a buffer under run is detected, the data recording doesn't be interrupted right away. In this embodiment, when the buffer under run occurs, the data of the data block (N) are being recorded. Before the data blocks stored in the buffer are used up, the recording doesn't stop until at least the main data of the data block (N) stored in the buffer have been recorded, i.e., the interruption occurs in the auxiliary data area of the data block (N). In general, the buffer is large enough to store one or several data blocks. Therefore, when the buffer under run occurs, the buffer still stores the data of the data block where the buffer under run occurs. This means it doesn't have the problem that the data is not available to be recorded before stop recording. In this embodiment, the ECCs have to be encoded again before the recording restarts, and the recording restarts at the beginning of the data block (N+1), i.e., the beginning of the data block next to the data block where the buffer under run occurs. The above-described method and the case without the buffer under run, both start the recording at the beginnings of data blocks, so that the recording manners can be unitized and it avoids the disadvantages of the prior art that the interruption position must be stored and the data in the second buffer must be maintained. As a result, the action of restarting recording is essentially equivalent to that of the original recording method, so the setting of the recording control signals becomes more convenient, thereby the control manners can be simplified, and the probability of error occurrence can be effectively reduced. Moreover, part of the ECCs may not be recorded when recording is interrupted, and therefore an unrecorded region exists between two adjoining data blocks. In other words, the recording doesn't start at the interrupted position, which differs from the prior art. Accordingly, to keep part of the ECCs not being recorded can avoid the overlap of the recording data caused by the inaccuracy start position of the restart recording that is too early.

In this embodiment, the recording is interrupted at the auxiliary data area located at the end of the data block rather than at the main data area for storing host data. Therefore, even if the recording quality is not good due to unstable actions such as the interruption and reconnection of the auxiliary data, or an error caused by data is not recorded, the correctness of the host data will not be affected, and thereby the recording quality of the entire disk can be maintained. In addition, as described above, the auxiliary data can be incompletely recorded to induce the discontinuity of the data, so as to avoid the situation of the overlap of the recording.

Figure 4:
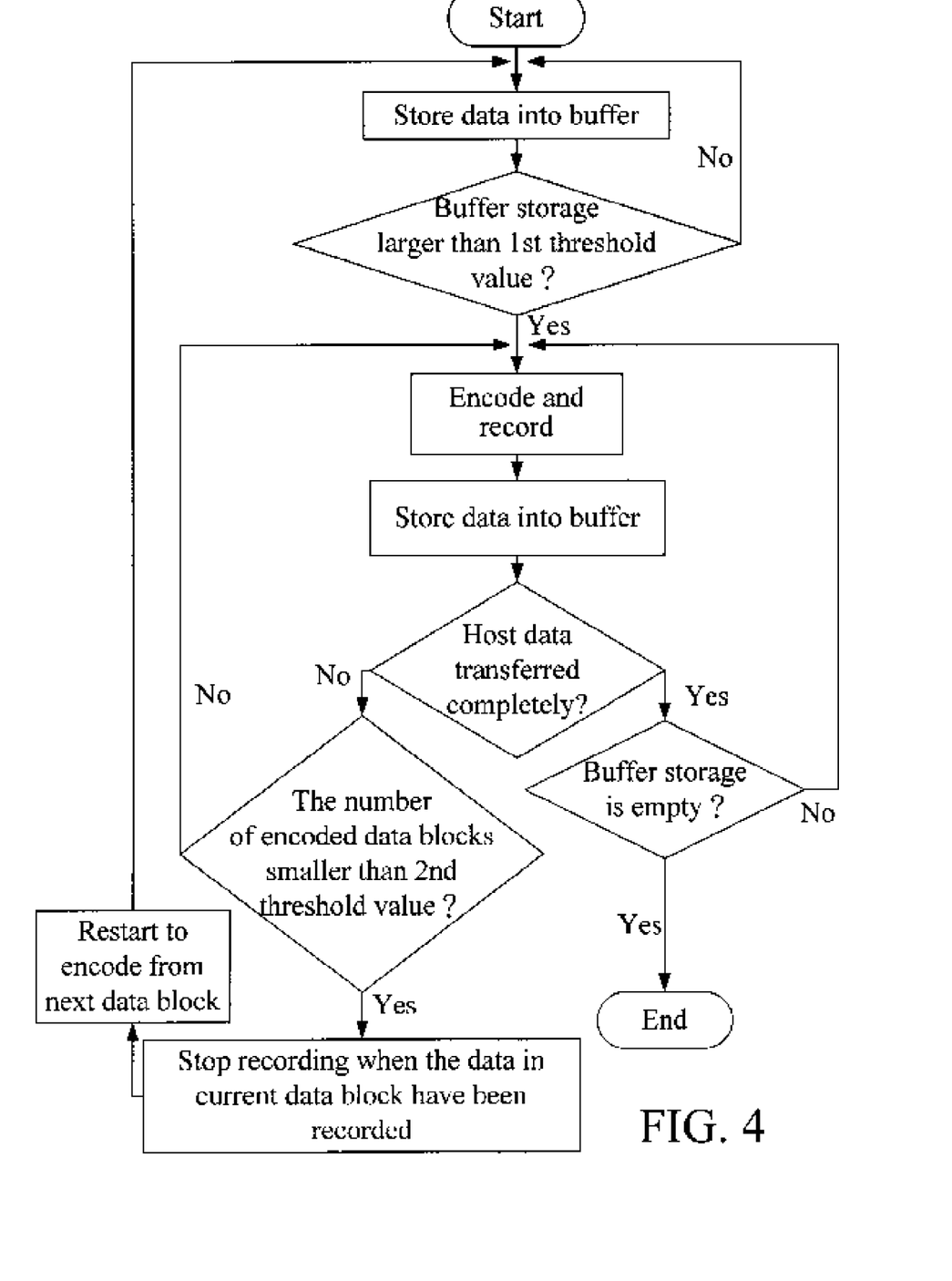
FIG. 4 illustrates the flow chart of the data recording method for an optical disk drive of the first embodiment in accordance with the present invention.

FIG. 4 is the data recording flow diagram of the above-described first embodiment. First, an optical disk drive receives host data transferred from a host and stores them in a buffer. Encoding and recording start if the amount of data stored in the buffer is larger than a first threshold value, otherwise more host data will be received and stored in the buffer. After the encoding and recording start, the optical disk drive continues receiving and storing the host data in the buffer until the host informs that the data have been transferred completely. If the data from the host have been transferred completely and no data remains in the buffer, it represents that all data have been recorded. Otherwise, the encoding and recording are performed continuously to record the data stored in the buffer to the disk. If the data have not yet been transferred completely and the number of the encoded data blocks is smaller than a second threshold value, i.e., the buffer under run occurs, the remaining data in the data block are recorded continuously, and the recording doesn't stop until at least the remaining main data of the data block, where the buffer under run occurs, in the buffer have been recorded completely. When the recording restarts, the data in the data block next to the data block where the recording is stopped have to restart encoding, so as to continue the record work of the next data block.

Besides the above-described buffer under run, the servo signal errors caused by vibration or defocusing also can result in the recording interruption.

Figure 5:
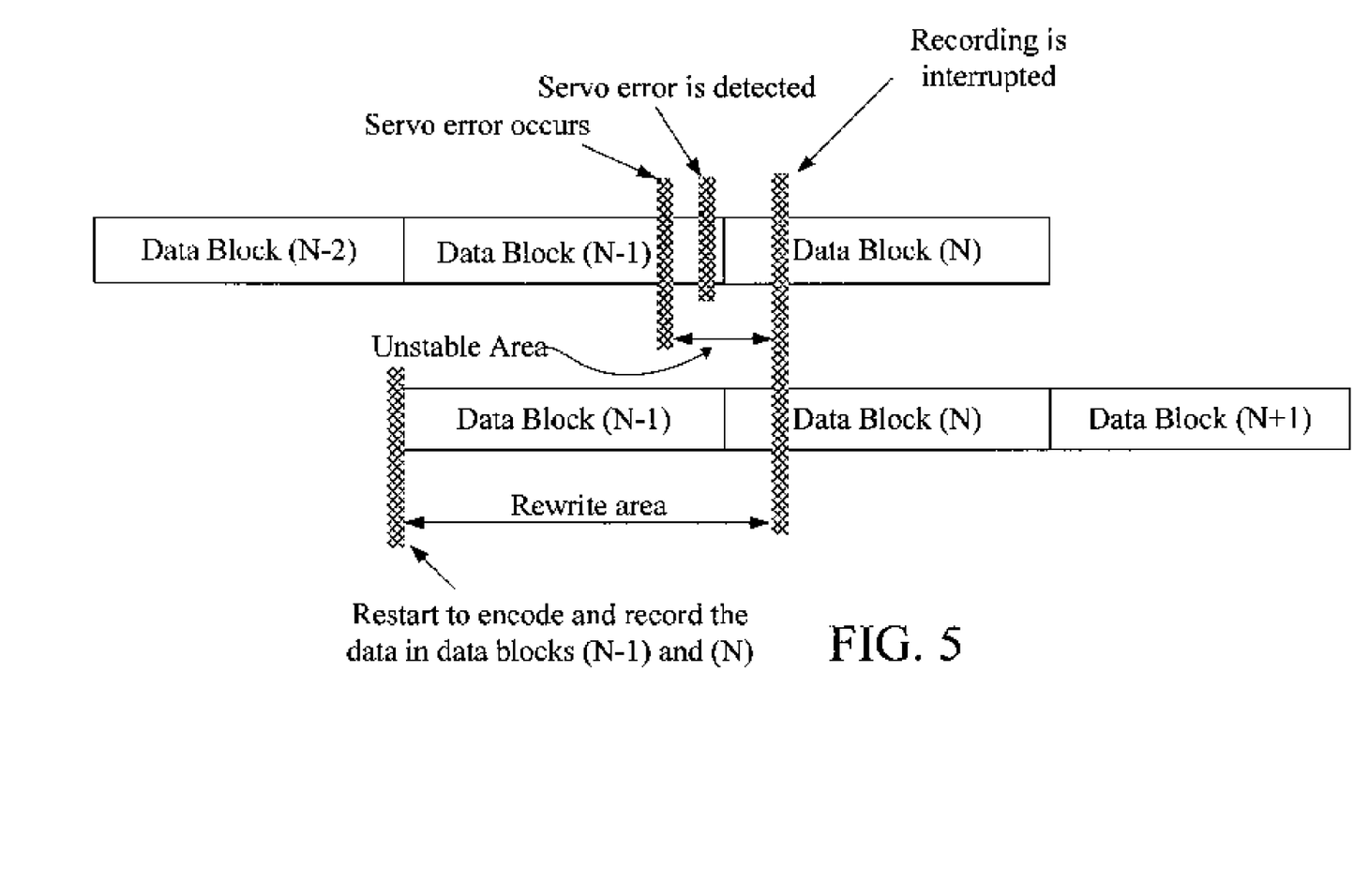
FIG. 5 illustrates the data recording method for an optical disk drive of the second embodiment in accordance with the present invention.

FIG. 5 is the illustrative diagram for the data recording method for an optical disk drive of the second embodiment, which shows the situation when a servo signal error occurs, and is applied to a rewritable disk. The servo error is an error on the servo system of an optical disk drive that results in the incorrectness of record, such as the motor control error on the servo system caused by vibration, disk track locking error or laser defocusing error. If the servo error occurs in the data block (N−1), and the time to detect the servo error is at the end of the data block (N−1), the recording cannot be timely interrupted in the data block (N−1) because the time to detect the servo signal is too close to the data block (N). Therefore, the recording is actually interrupted in the data block (N). Because the buffer under run only relates to the problem that data cannot be transferred timely, the data recording quality before the interruption, in general, is not affected. However, the servo error is due to the physical out-of-control status such as vibration and laser focusing failure, so the correctness of data recording between the servo error occurrence and the record interruption is unreliable. In order to avoid the above-described problem, the time to restart encoding and recording is set at the beginning of the data block (N−1), i.e., the beginning of the data block ahead of the data block (N) where the recording is interrupted. In other words, data in the data block (N−1) and data in the data block (N) before interruption are re-recorded again, so as to remove the anxiety of unreliable recorded data.

The above-described re-recorded area is not limited to extend to the adjacent data block ahead of the data block occurring interruption, and can be determined according to practical conditions. For example, previous multiple data blocks are re-recorded, or only the data block where the recording is interrupted are re-recorded. If there is unreliable recorded data caused by servo error exists, all the relative data blocks can be re-recorded again. Moreover, when the disk is a rewritable disk, the recording method of the second embodiment also can be applied to the situation of the buffer under run, i.e., the buffer under run is deemed a servo error.

Figure 6:
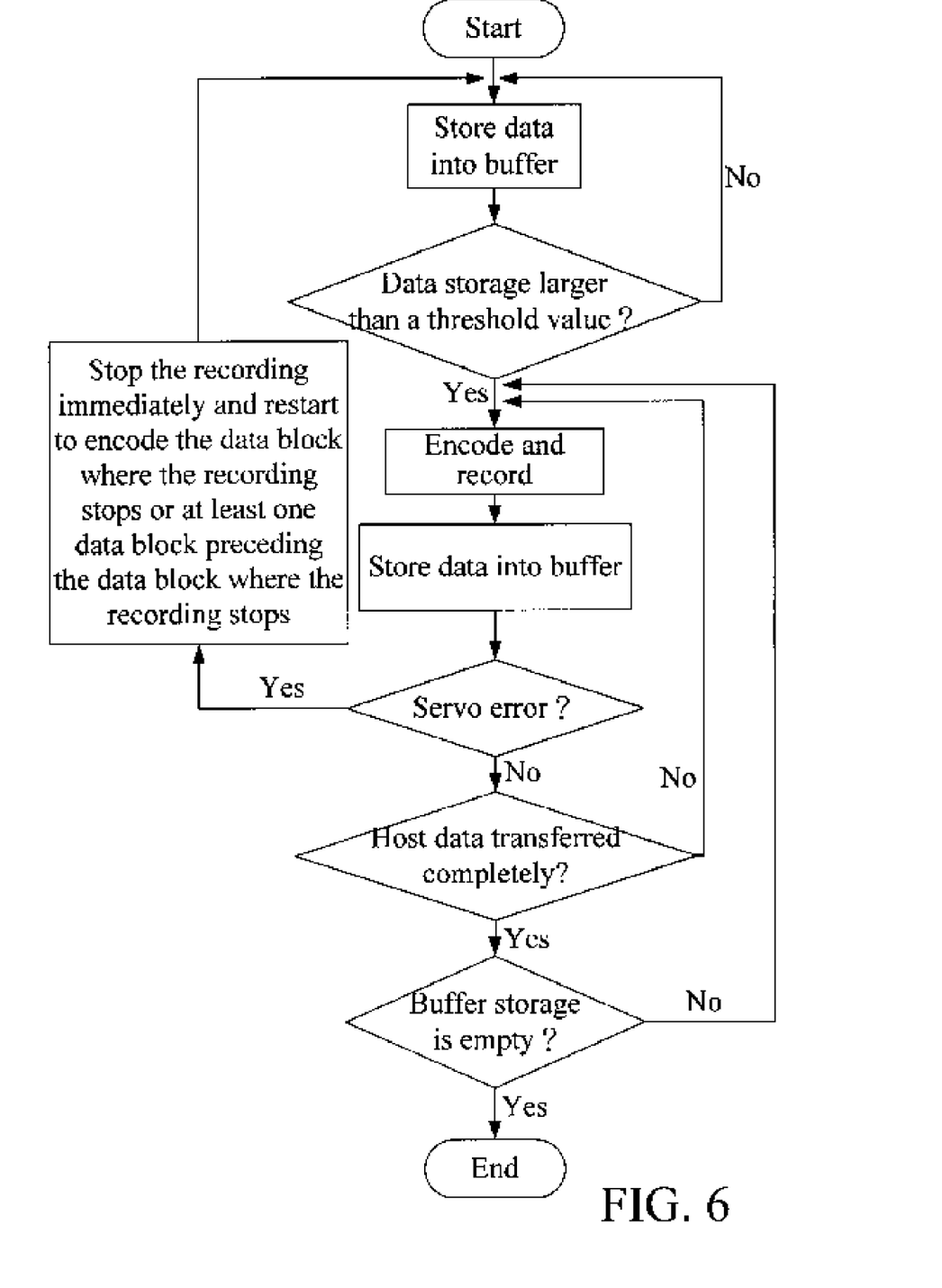
FIG. 6 illustrates the flow chart of the data recording method for an optical disk drive of the second embodiment in accordance with the present invention.

FIG. 6 is the data recording flow chart of the second embodiment. First, the data are stored in a buffer, and the data encoding and recording starts if the amount of data stored in the buffer is larger than a threshold value, otherwise the host data are received continuously and stored in the buffer. Afterwards, while encoding and recording, the host data are received continuously and stored in the buffer. If a servo error occurs, the recording stops immediately, and it restart to encode and record a data block preceding the data block where the recording stops or the data block where the recording stops. If there are no servo errors, the question whether the host data have been transferred completely is verified. If the data have been transferred completely and no data remains in the buffer, it represents that all data have been recorded. If the host data have not yet been transferred completely or the data storage of the buffer is not empty, the encoding and recording continue.

The data recording method for an optical disk drive of the present invention mainly is applied to the current digital video drive (DVD). However, it is possible that an optical disk drive of a new type appears in the future only if the optical disk drive of a new type applies the technique in accordance with the present invention, which is covered by the scope of the present invention.

The above-described embodiments of the present invention are intended to be illustrative only. Numerous alternative embodiments may be devised by those skilled in the art without departing from the scope of the following claims.

What is claimed is:

1. A data recording method for an optical disk drive, comprising the steps of:

encoding and recording data blocks, wherein each of the data blocks comprises a main data and an auxiliary data;

detecting whether a buffer under run occurs;

stopping a recording operation after the main data of a currently recording data block been recorded onto the optical disk, if the buffer under run occurs; and restarting to encode and record from the next data block, wherein the recording operation stops after the main data which the buffer under run occurs.

2. The data recording method for an optical disk drive in accordance with claim 1, wherein the buffer under run is detected if the number of encoded data blocks is smaller than a threshold value.

3. The data recording method for an optical disk drive in accordance with claim 1, wherein the auxiliary data area stores error correction codes of the main data area.

4. The data recording method for an optical disk drive in accordance with claim 1, which is applied to a digital video drive (DVD).

5. A data recording method for an optical disk drive, comprising the steps of:

recording a plurality of encoded data blocks, wherein each of the data blocks comprises a main data area and an auxiliary data area;

detecting whether a buffer under run occurs;

stopping a recording operation after the main data of a data block been recorded onto the optical disk, if the buffer under run occurs; and restarting to encode and record from the next data block.

6. The data recording method for an optical disk drive in accordance with claim 5, wherein the buffer under run is detected if the number of encoded data blocks is smaller than a threshold value.

7. The data recording method for an optical disk drive in accordance with claim 5, wherein the auxiliary data area stores error correction codes of the main data area.

* * * * *